Inventor
James Fraser
By
C. B. Singer, Atty

UNITED STATES PATENT OFFICE

JAMES FRASER, OF GLASGOW, SCOTLAND, ASSIGNOR TO DUNCAN CAMPBELL, OF GLASGOW, SCOTLAND

POWER-TRANSMITTING AND SPEED-REGULATING GEAR

Application filed May 7, 1926, Serial No. 107,510, and in Great Britain May 26, 1925.

The transmitting gear forming the subject matter of the present application possesses the important features of wide range of speed variation and reversibility of the driven member relatively to that of the driving member, also the automatic regulating of the driving force in proportion to the resistance. These features, among others, make it specially applicable to motor-car and other non-reversible engines.

The invention consists of, primarily, two turbines, one of which is employed as the impelling member, mounted on a shaft, deriving its power from an external source—the other turbine on the driven shaft. These shafts are co-axial and the turbines so disposed that the passages through them are radial and form part of a closed circuit or path for a liquid which, when in operation, is maintained in circulation by the aforesaid impelling turbine. The blades of the impelling turbine are so formed that the liquid in passing through them receives an increment of velocity proportional to the amount of energy expended thereon, and passing into the secondary or driven turbine delivers up thereto the greater portion of its available energy, thus maintaining it in constant rotation.

Reversal of the secondary member or turbine may be secured by the following method:—The secondary turbine is provided with two series of blades of contrary or reverse section—one for the forward motion, the other for the reverse. These are fixed at or near the periphery of a disc mounted on the driven shaft and by suitable means is adapted to move axially on the same and thus bring either series into the flow from the impelling turbine. The discharge from the impeller or driven turbine may be thus turned in either of two opposite directions, and likewise the torque or turning movement on the turbine wheel, while that on the primary turbine remains constant in one direction.

The discharge from the impelling turbine is not delivered radially but at an angle considerably in advance in the direction of rotation and to prevent any tendency of the liquid on that account to counteract the effect or work of the reversing series of the driven turbine, stationary blades are interposed between the primary turbine and the latter to divert the flow more in the radial direction.

The variation of the tractive force or turning moment of the driven member is automatically determined by the system itself. For, when the resistance increases, the driven member slows down and the velocity of the liquid being discharged therefrom increases, considered relatively to a fixed point in the system, and the liquid thus enters and leaves the blades of the turbine impeller, with an increment of kinetic energy, which by its reaction in passing through the blades of the secondary turbine augments the torque or turning force thereon. The turning force thus continues to increase as the angular velocity of the secondary turbine diminishes. As the load or resistance diminishes, the reverse operation takes place, the velocity of the liquid leaving the driven member into space diminishes and therefore enters and leaves the primary turbine at a less speed, and this again entering and leaving the driven member, exerts proportionally less driving or turning force thereon.

The velocity and virtual direction of the liquid entering the blades of the impelling turbine in the plane of rotation thus necessarily changes from time to time and to prevent any tendency to variation in the speed of said turbine in consequence thereof, the blades of the primary turbine are so designed and otherwise arranged that the entrance edges are parallel to the virtual angle of liquid entry into the same at maximum velocity, in order that the liquid passes through them without adding to the work of the motor or engine, or causing it to race or increase in speed. This secures an increased torque on the driven shaft above the normal and makes the gear specially suitable for overcoming great resistance.

The liquid on leaving the series of blades for the forward motion, still at a considerable velocity, is received by stationary blades arranged opposite and equal in number to the former. These blades are adapted to move axially with the operating series and divert or turn the direction of flow through a right angle to the plane of rotation of the turbines. From these the liquid fluid passes into separate channels leading to the extreme edge of the impeller blades, and this commences a new cycle of operation.

The said diverting blades are so formed and arranged that the same amount of liquid passes through each of them at every instant in a continuous stream and thus avoid any loss of kinetic energy by impact or eddy formation.

The method of maintaining a predetermined quantity of liquid in circuit in the working chamber is as follows:—

At the upper side of the casing, a Pitot tube is inserted, the inner end communicating with the passage of the liquid medium—the outer with the top end of a cylinder having a movable piston inside and adapted by its movement to regulate or control the admission of compressed air in the working chamber for the purpose and in the manner about to be explained. The outlet orifice from the said Pitot tube faces or is in the same direction as the flow of the liquid medium, and thus when the cross sectional area of the stream increases to such an extent that the outlet aperture from the Pitot tube is surrounded therewith a reduction of pressure is produced on the top of the aforesaid piston, causing it to rise in the cylinder by the air pressure underneath. This movement of the piston is employed to open a supply of air under pressure into the working chamber thereby stopping the liquid supply from the reservoir and, by a suitable arrangement of valves, force any surplus liquid in the working chamber back again into the reservoir. On the other hand, when the liquid supply in the working chamber is not sufficient, the Pitot tube becomes uncovered and the air therethrough passes to the top of the piston aforesaid, causing or allowing it to fall, an in doing so is made to operate a series of valves, having the effect of admitting a supply of air under pressure into the reservoir and force out a fresh supply of liquid into the working chamber until such supply is arrested as above explained.

In order that my invention may be properly understood and readily carried into effect, I have hereunto appended four sheets of drawings, of which Figure 1 is a longitudinal sectional view partly in elevation of a power transmitting and speed regulating gear constructed in accordance with this invention.

Figure 1:
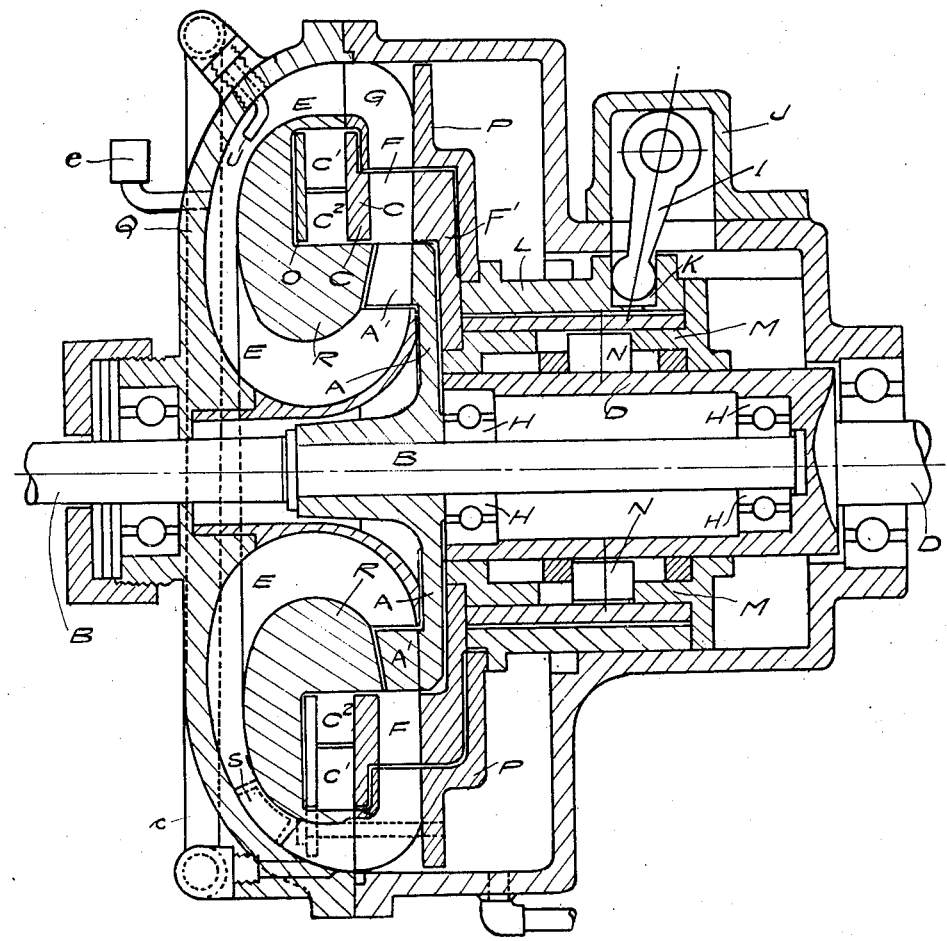
Figure 6:
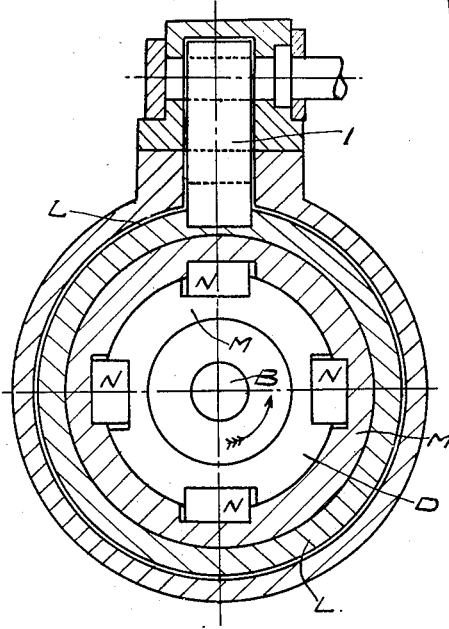
Figure 6 is a transverse sectional view on the line 6—6 of Figure 5.
Figure 2:
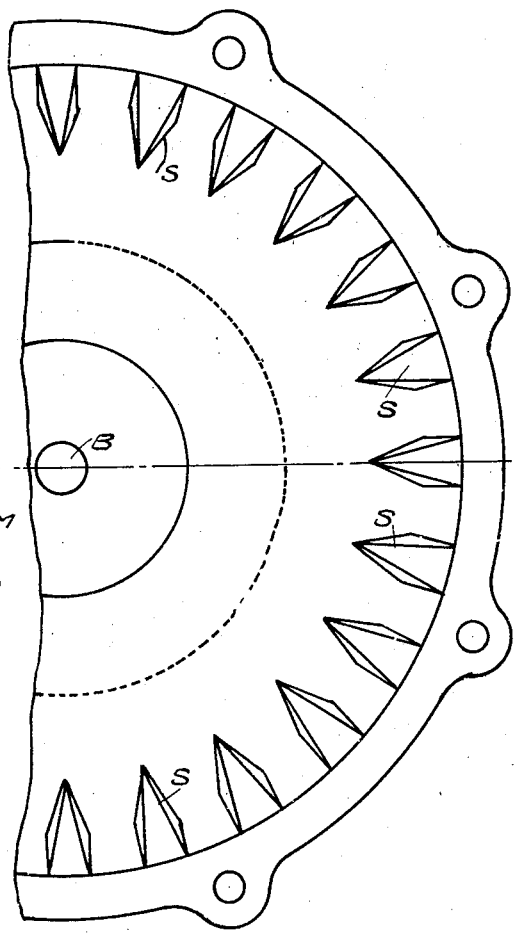
Figure 2 is a detail elevation of a portion of the casing.

Referring to the drawings, A is the impelling turbine disc, B the shaft on which it is mounted. C is the reversing turbine disc suitably fixed to the ahead turbine disc F' on the driven shaft D, while E is the passage or conduit through which the liquid passes when any of the turbine discs A and C or A and F' are working. This turbine disc C forms an integral part with the disc F' and carries the reversing turbine blades C'. The reversing stationary blades $C^2$ are fixed to a stationary disc O which is suitably carried and connected to a disc P which disc is fixed to the sleeve L. The conduit E is formed by an outer casing Q and an inner piece R. The inner piece R may be integral with the outer casing Q or may be connected to the outer casing Q by pieces S. The inner piece R has a suitable recess T formed thereon in which the disc O, reversing turbine blades C', the reversing stationary blades $C^2$, and the turbine disc C are enclosed when the turbine blades F are in operation with the impelling blades A' of the turbine A. The liquid passes through these blades A' and reacts on the ahead blades F and then passes through the guide blades G to the conduit E, and thus gives motion to the turbine blades F which are suitably connected to the disc F', which disc F' is suitably connected to the sliding sleeve M sliding on the driven shaft D. N are keys in the form of rollers which are partially engaged with the sliding sleeve M and the driven shaft D. These rollers, while allowing freedom of motion axially prevent any angular movement between the said members M and D. This driven shaft D is carried on ball bearings H fixed on the driving shaft B. In order that the blades C' of the reversing turbine C can be slid into line with the impelling turbine A so that the reverse motion can be given to the driven shaft D a reversing lever I, suitably pivoted to the bracket J, which is engaged with a recess K in the sleeve L, which is mounted on the sliding sleeve M but does not revolve with it but controls its longitudinal movements, is operated. This operation slides the reversing turbine disc C in line with the blades A' of the impelling turbine disc A.

Figure 7:
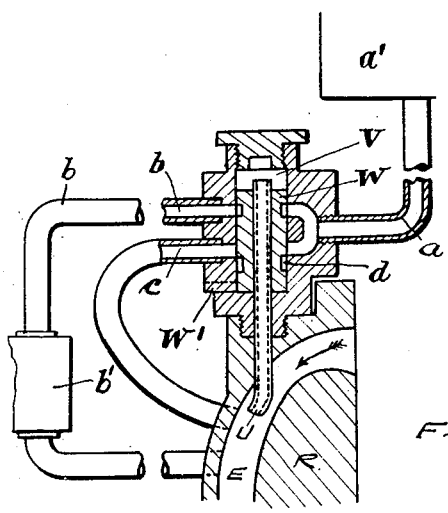
Figure 7 is a detail sectional view of the automatic valve and associated elements used for supplying and maintaining the required amount of liquid in the working chamber.
Figure 3:
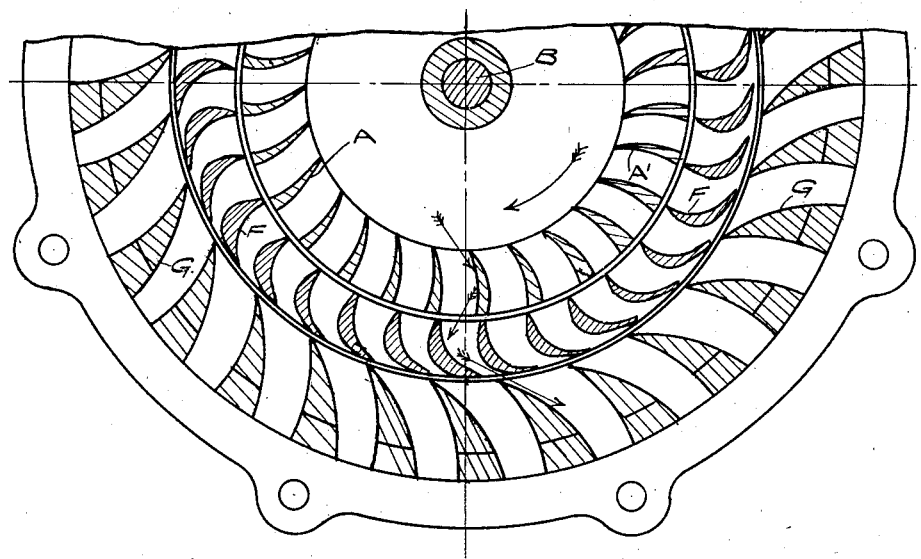
Figure 3 is a detail sectional view, partly in section, of the forward turbine and associated elements.
Figure 4:
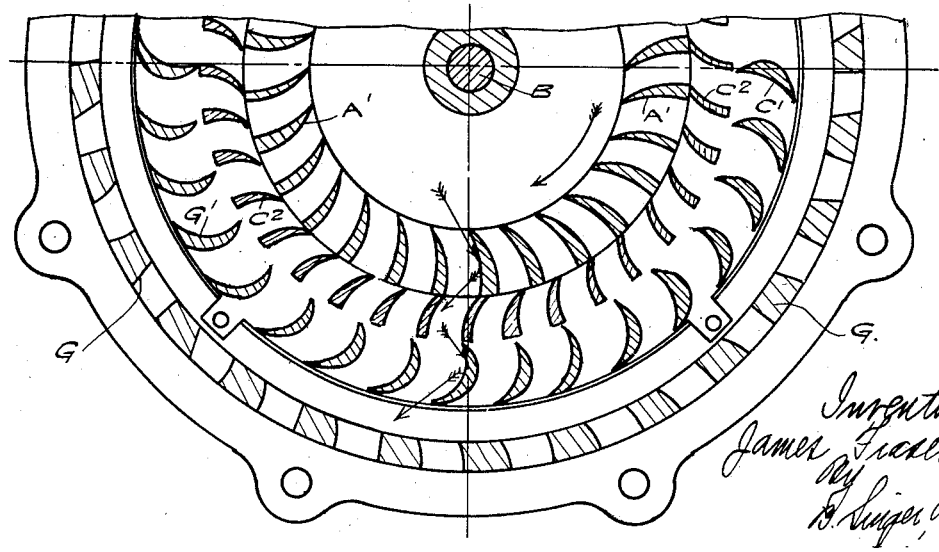
Figure 4 is a similar view showing the turbine arranged in reversing position.
Figure 5:
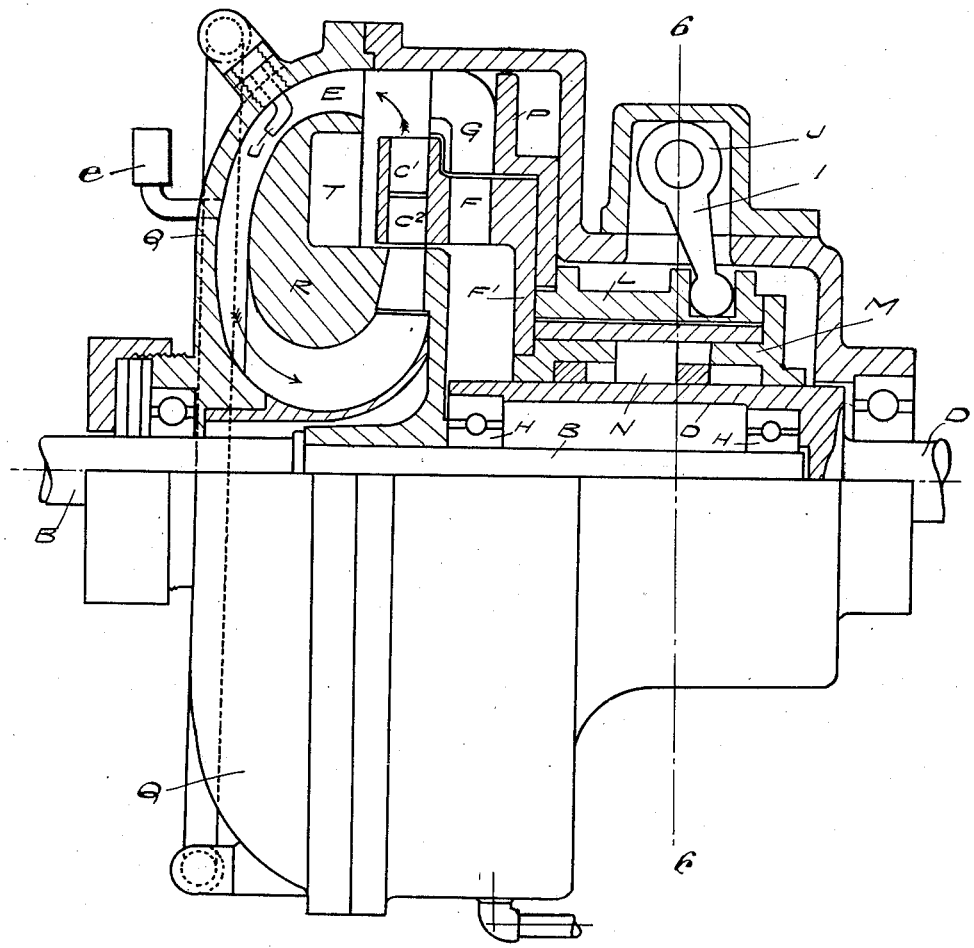
Figure 5 is partly an elevation and partly a longitudinal section of the same.

U is the Pitot tube which is inserted in the conduit E, the other end communicating with the upper end of a cylinder V, Figure 7. This cylinder V contains a moving piston W, the lower side of which piston W is open to atmospheric pressure by ports W'. a is the pipe from the air receiver a', b the pipe leading to the liquid reservoir b' and c the pipe leading into the working chamber E. The direction the compressed air from the receiver a' takes is controlled by the said Pitot tube U and valve. Thus when the fluid in circuit in the chamber E has increased to such extent that the outlet from the cylinder V is covered by the liquid, a partial vacuum is created on top of the piston W, thereby causing it to ascend in the cylinder V by the air pressure underneath and opening a passage from air receiver to working chamber through the port d at the same time closing communication between air receiver a' and liquid reservoir. The drawing shows the position when the liquid is being forced into chamber E. The compressed air enters the reservoir and forces out the liquid until the outlet from the Pitot tube U is again covered. The said valve and Pitot tube performs the part of a distributor and serves to put the working chamber in communication with either the air receiver or reservoir, the further movement of liquid being determined by hand control. A relief valve to allow excess of air in the working chamber E to escape is indicated at e.

The liquid reservoir is connected to the working chamber by a suitable pipe, not shown in the drawings, and the valve shown in Figure 7 is for the purpose of controlling the air supply either to the working chamber or the liquid reservoir, so as to cause exchange of liquid along these means, no liquid passing through said valve arrangement.

I claim:

1. Gearless power transmission apparatus comprising a driving shaft, a tubular driven shaft rotatably mounted thereon, a turbine fixed to the driving shaft and having impelling blades, an ahead turbine, a sleeve to which said ahead turbine is fixed, said sleeve being mounted for axial movement on the driven shaft and for rotation therewith, a reversing turbine disk fixed to said ahead turbine and having reversing blades, a controlling sleeve mounted for rotation with respect to the first named sleeve and the ahead turbine and to move said first named sleeve and said ahead turbine axially, a shifter for said controlling sleeve, a casing mounted for relative rotation on the driving shaft and having a conduit for the passage of liquid to the turbine blades, a disk in the casing, fixed to and movable with the controlling sleeve and having guide blades movable to and from the outer end of the said conduit, and a disk fixedly connected to the last named disk and having fixed reversing blades arranged in a circle within and concentric to that in which the first named reversing blades are arranged, all constructed and arranged so that the ahead turbine may be shifted to bring its ahead blades into alinement with the impelling blades, and the guide blades, or into alinement with the said reversing and fixed reversing blades.

2. Gearless power transmission apparatus comprising a driving shaft, a tubular driven shaft, rotatably mounted thereon, a turbine fixed to the driving shaft and having impelling blades, an ahead turbine, a sleeve to which said ahead turbine is fixed, said sleeve being mounted for axial movement on the driven shaft and for rotation therewith, a reversing turbine disk fixed to said ahead turbine and having reversing blades, a controlling sleeve mounted for rotation with respect to the first named sleeve and the ahead turbine and to move said first named sleeve and said ahead turbine axially, a shifter for said controlling sleeve, a casing mounted for relative rotation on the driving shaft and having a conduit for the passage of liquid to the turbine blades, a disk in the casing, fixed to and movable with the controlling sleeve and having guide blades movable to and from the outer end of the said conduit, and a disk fixedly connected to the last named disk and having fixed reversing blades arranged in a circle within and concentric to that in which the first named reversing blades are arranged, all constructed and arranged so that the ahead turbine may be shifted to bring its ahead blades into alinement with the impelling blades, and the guide blades, or into alinement with the said reversing and fixed reversing blades, said casing having a piece the surface of which forms one side of said conduit, said piece having an annular recess to receive said reversing and fixed reversing blades.

In witness whereof I affix my signature.

JAMES FRASER.